Figure 1:
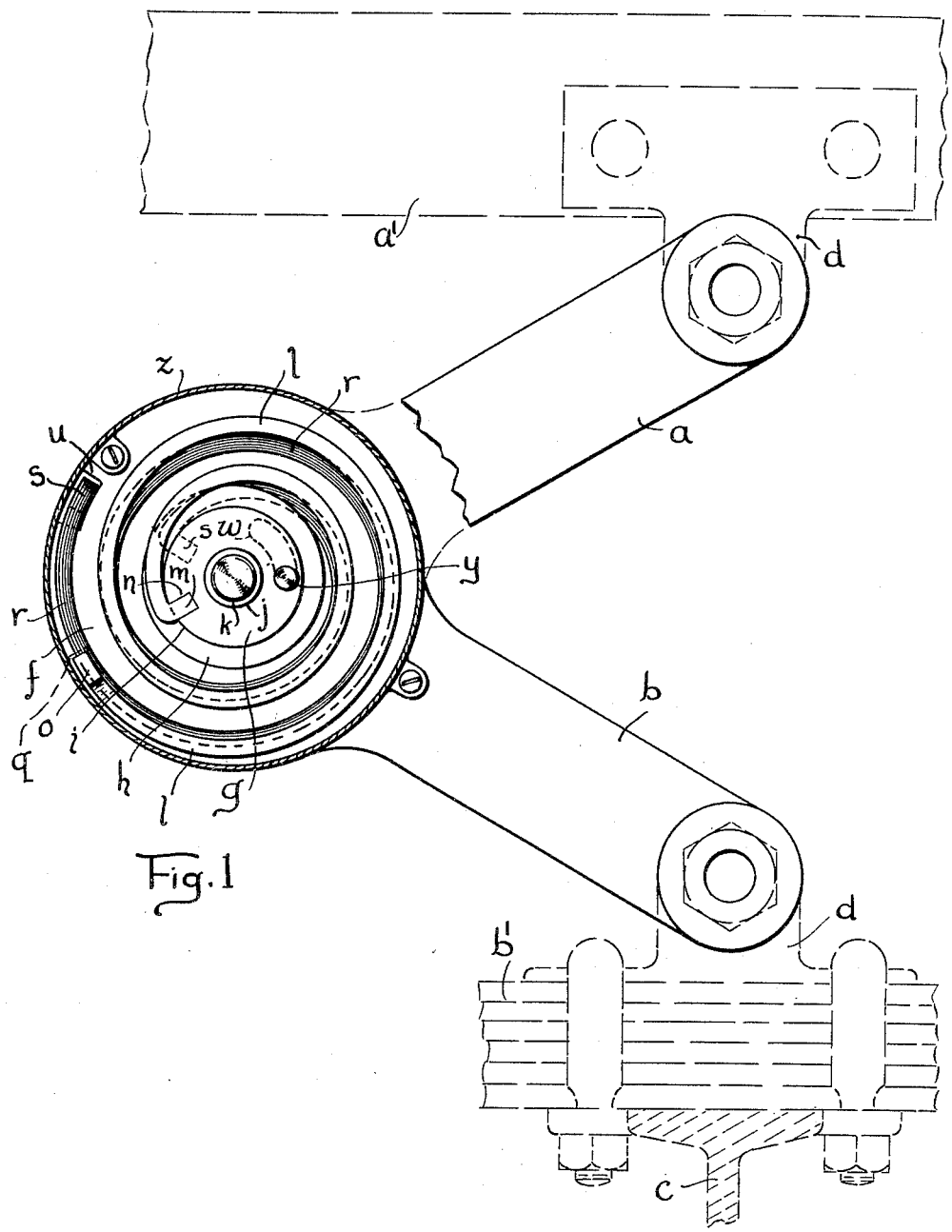

P. GRESSER.
SHOCK ABSORBER.
APPLICATION FILED JAN. 19, 1914.
1,099,646.
Patented June 9, 1914.
2 SHEETS—SHEET 2.
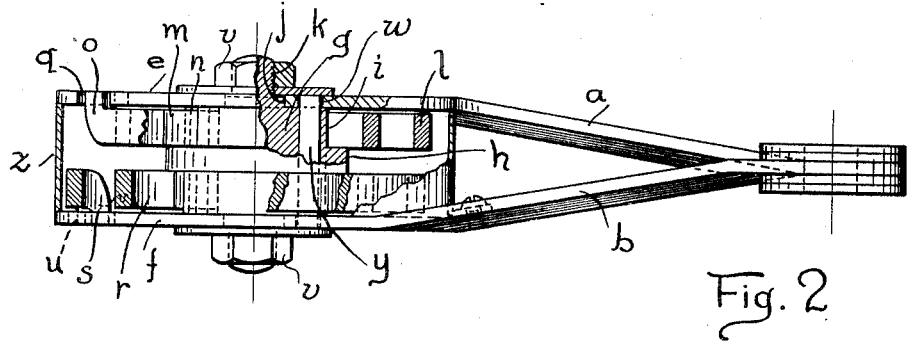
Fig. 2
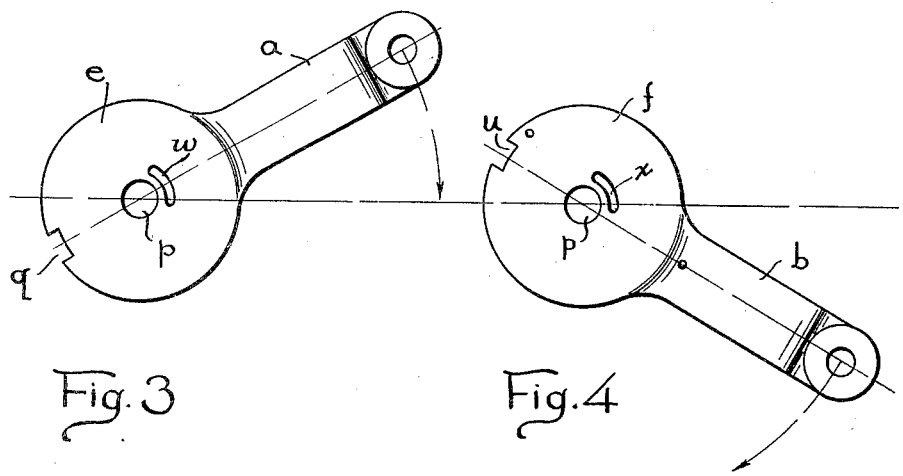
Fig. 3          Fig. 4
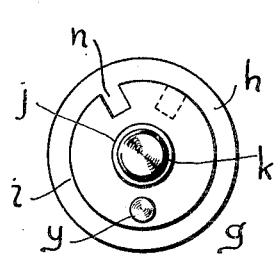   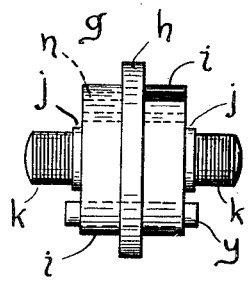
Fig. 5          Fig. 6
WITNESSES
Robert N. ?
Virginia C. Spratt.
INVENTOR
Peter Gresser
BY
Ratzemond H. Parker,
ATTORNEY
COLUMBIA PLANOGRAPH CO., WASHINGTON, D. C.

UNITED STATES PATENT OFFICE.

PETER GRESSER, OF DETROIT, MICHIGAN, ASSIGNOR TO THE BUCKEYE SUSPENSION COMPANY, A CORPORATION OF OHIO.

SHOCK-ABSORBER.

1,099,646.  Specification of Letters Patent.  Patented June 9, 1914.

Application filed January 19, 1914. Serial No. 812,923.

*To all whom it may concern:*

Be it known that I, PETER GRESSER, a subject of the Emperor of Germany, residing at Detroit, county of Wayne, State of Michigan, have invented a certain new and useful Improvement in Shock-Absorbers, and declare the following to be a full, clear, and exact description of the same, such as will enable others skilled in the art to which it pertains to make and use the same, reference being had to the accompanying drawings, which form a part of this specification.

This invention relates to shock absorbers and has for its object a shock absorber of the two pivoted arm type in which the action of the spring is resisted by spring resistance rather than the customary frictional resistance of shock absorbers of this form.

In the drawings,—Figure 1, is a view of the shock absorber showing it attached to the chassis and axle of a vehicle, the disk-like head portion of one of the arms being removed to show the interior parts. Fig. 2, is a cross-section through the inclosing shell formed by the head portions of the arms. Fig. 3, is a detail of one of the arms. Fig. 4, is a detail of the other arm. Fig. 5, is a side elevation of the central element. Fig. 6, is an elevation showing the periphery of the central element.

$a'$ indicates a part of the chassis; $b'$ a fragment of the vehicle spring which is attached to the axle $c$. A bracket $d$ is attached to each element and one bracket pivots each arm. The arms enlarge at their outer ends each forming a disk-like head—the arm $a$ the head $e$, the arm $b$ the head $f$. They are pivoted together by the central element or bearing $g$. This central element comprises a member having its circular periphery of four distinct diameters. The central portion is of the largest diameter and may be called the spring spacer on account of its function. It is lettered $h$. On either side of this spring spacer are portions of reduced diameter which will be called spring rests and which are lettered $i$. On the outside of each of these spring rests is a reduced portion which acts as a bearing for the disk-like head of the arm and which will be called the arm bearings $j$. On the outside of each of these arm bearings is a still further reduced portion which is threaded and which is lettered $k$. These will be known as the screw portions.

A coil spring $l$ is fastened to the left-hand spring rest $i$ by having its end $m$ turned into the recess $n$ of the left-hand spring rest. Its outer end $o$ is attached to a block which projects outward from the plane of the spring. When the disk-like head $e$ of the arm $a$ is fitted over the screw portion to bring the central opening $p$ upon the left-hand arm bearing $j$ the notch $q$ in the outer periphery of the disk-head $e$ will fit over the projecting end $o$. Hence the spring at one end is locked to the central element while at the other end it is locked to the arm element. Similarly on the opposite side of the spring spacer $h$ a coil spring $r$ is located, the end $s$ being similarly fastened to the central element while the outer end $s$ projects out of the plane of the spring and may be engaged by the notch $u$ in the disk-like head $f$ of the arm $b$. The heads of the arms are held in place by the nuts $v$ on the end of the screw portion. Each of the heads is provided with a segmental slot—the head $e$ with a slot $w$ and the head $f$ with the slot $x$.

A pin $y$ protrudes through the central element and projects on either side of the spring rests. These projecting portions protrude through the segmental slots $w$ and $x$. These segmental slots are differently located with respect to the notches on the disk-like heads so that only a single pin is required. However, by using protruding pin portions on the sides of the spring rests, which are not in alinement, the slots $w$ and $x$ may be located in the same relation with respect to the notches on the periphery of the disks.

When the shock is received by the springs, which tends to cause the axle and the chassis to approach toward each other, the arms $a$ and $b$ are made to approach each other. The arm $b$ strikes the adjacent pin portions $y$, while the arm $a$ moves toward the arm $b$ without striking its pin portion $y$. Hence the central element is caused to rotate slightly in counter-clockwise way (see Fig. 1). However, as the disk-like head $f$ of the arm $b$ engages with the outer end $o$ of the spring $l$, this spring is not brought into action for the disk head and central element do not rotate relatively to each other.

But the arm *a* with its disk-like head *e* engaging with the head *o* of the spring *r* causes the outer end of the spring *r* to be drawn around in a clockwise direction, while the central element rotating in a counter-clockwise way and engaging with the other end *s* of the spring *r* causes the inner end to be drawn around in a counter-clockwise way. This spring is therefore put under stress and resist the movement of the arms *a* and *b* together. Upon the rebound of the main springs of the vehicle the other arm—the arm *a*—engages with its projecting pin portion *y* and the central element is rotated in counter-clockwise way, but inasmuch as the head *e* of the arm *a* is also rotating in counter-clockwise way the spring *r* is not put under tension, but it will be found that the spring *l* is put under tension by reason of the central element rotating in counter-clockwise fashion and the head *f* of the arm *b* rotating in clockwise fashion. Hence whichever way the arms are going, whether approaching or separating, either one or the other spring is put under tension and tends to resist the action of the vehicle springs.

In the drawings I have shown a ring *z* which incases the springs. This may be attached to either one disk-head or the other, or for that matter two rings may be used to overlap, each ring being attached to one of the disk heads.

What I claim is:

1. A shock absorber, comprising a pair of pivoted arms, a central element, a pair of coiled springs about the central element, one of the springs being fastened to one arm and the central element, and the other spring being fastened to the other arm and the central element, and means for connecting one arm to rotate the central element when the arms approach each other and for connecting the other arm and the central element when the arms separate from each other.

2. A shock absorber, comprising a pair of pivoted arms having segmental slots, a central element having projecting pin portions on either side that move in the said segmental slots, and a pair of coiled springs about the central element, one fastened to the central element and one arm and the other fastened to the central element and the other arm, whereby when the arms approach each other one arm moves the central element and when the arms separate from each other, the other arm moves the central element.

3. A shock absorber, comprising a pair of pivoted arms having segmental slots, a central element consisting of a spring spacer and a spring rest on each side of the spring spacer, and projecting pin portions, one on each side of the spring rests, said projecting pin portions arranged to move in said segmental slots, and a pair of coil springs one of which is fastened to the central element and one arm and the other of which is fastened to the central element and the other arm.

4. A shock absorber, comprising a pair of pivoted arms having disk-like heads, a central element for pivoting the disk-like heads together and consisting of a spring spacer, a spring rest on each side of the spring spacer, and a projecting pin portion on the outside of each spring rest, the said disk-like heads being provided with segmental slots through which the pin portions protrude and peripheral notches, and a pair of coiled springs one of which is fastened to the central element and has a laterally projecting outer end that fits into peripheral notch of one arm and the other of which is fastened to the central element and has an outer laterally projecting end that fits into the peripheral notch of the other arm.

In testimony whereof, I sign this specification in the presence of two witnesses.

PETER GRESSER.

Witnesses:
 STUART C. BARNES,
 MARIETTA E. RUDD.

---

Copies of this patent may be obtained for five cents each, by addressing the "Commissioner of Patents, Washington, D. C."